J. GANDOLFO.
Charcoal and Bone-Black Heaters and Coolers.
No. 165,993. Patented July 27, 1875.
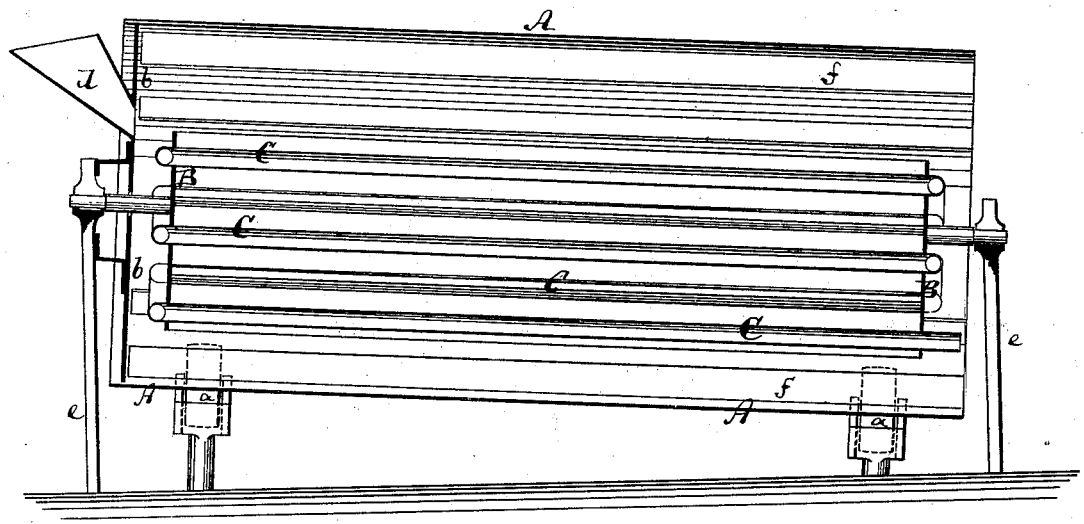
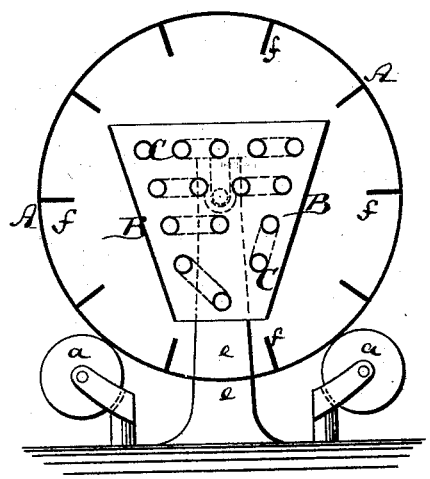
Witnesses:
A. Moraga
Ernest E. Webb
Inventor
J. Gandolfo
by his attorney
A. v. Briesen

UNITED STATES PATENT OFFICE.

JOSEPH GANDOLFO, OF BROOKLYN, ASSIGNOR TO HIMSELF AND JOHN W. JARBOE, OF GREEN POINT, NEW YORK.

IMPROVEMENT IN CHARCOAL AND BONE-BLACK HEATERS AND COOLERS.

Specification forming part of Letters Patent No. 165,993, dated July 27, 1875; application filed July 3, 1875.

*To all whom it may concern:*

Be it known that I, JOSEPH GANDOLFO, of Brooklyn, Kings county, New York, have invented an Improved Charcoal and Bone-Black Heater and Cooler, of which the following is a specification:

This invention relates to a new apparatus for thoroughly drying or heating, or cooling charcoal, bone-black, or other substances, and consists in placing within an inclined rotary drum, which is provided with inwardly-projecting blades or ribs, a stationary cooling-vessel which is traversed by water or steam conduits, as hereinafter more fully described.

In the accompanying drawing, Figure 1 is a vertical longitudinal section of my improved charcoal and bone-black heater and cooler. Fig. 2 is a vertical transverse section of the same.

Similar letters of reference indicate corresponding parts in both figures.

The letter A represents a cylindrical rotary drum, supported in a slightly-inclined position by friction-rollers *a a*, or by equivalent means. B is a stationary cooling, heating, or drying vessel, firmly supported at its ends on a stationary floor by uprights *e e*, or otherwise. This vessel B is made with flaring sides, and is open at the top and bottom. It is also slightly inclined, as shown, and extends lengthwise through the drum, that can be revolved around it. C C are hollow water-conduits, shelves, or pipes, that pass in zigzag or other direction through the vessel B. The inner face of the drum A is lined with a number of inwardly projecting, preferably radial, blades or ribs *f f*, as shown. That end of the drum A which is the most elevated is closed by a fixed plate, *b*, which attached to and supported by one of the uprights *e*. The fixed plate *b* is provided with a hopper, *d*, as shown. Rotary motion may be imparted to the drum A by pinions, belts, or otherwise.

The operation of the apparatus is as follows:

The bone-black, charcoal, or other substance to be dryed, heated, or cooled is, through the hopper *d*, introduced within the drum A, to which rotary motion is imparted. The bone-black or other substance falls from the hopper *d* to the bottom of the drum A, between the ribs *f f*, and will, during the rotation of the drum, be gradually carried by the ribs to the top of the drum A, from where it will fall into the vessel B. Through the pipes C hot or cold water, steam, or other fluid is caused to pass, according to the effect to be obtained on the charcoal or other matter introduced within the drum A—that is to say, if the matter is to be cooled, cold water or other cooling medium is used, and if it is to be heated hot water, steam, or the like is used. The charcoal or other substance will, on entering the vessel B, come in contact with the tubes C, and be dried, cooled, or otherwise affected by them in the desired manner. By the inclination of the vessel B and drum A the matter is gradually fed toward and finally discharged at the lower end of the drum. Instead of making the vessel B with flaring sides, as is shown, the same may be made rectangular in cross-section, and the additional space thereby obtained may also be filled with hot or cold water, steam, or other fluid, used for heating, drying, or cooling the charcoal or other substance. The drum A may revolve in water or steam, or be otherwise surrounded by such fluid.

I claim as my invention and desire to secure by Letters Patent—

The combination of the rotary inclined drum A, which is provided with the inwardly-projecting blades *f*, with the stationary inclined vessel B, containing the pipes or hollow shelves C, substantially as herein shown and described, and for the purpose specified.

JOSEPH GANDOLFO.

Witnesses:
E. C. WEBB,
F. V. BRIESEN.